(12) United States Patent
Sibeud et al.

(10) Patent No.: US 9,241,372 B2
(45) Date of Patent: Jan. 19, 2016

(54) DEVICE AND METHOD FOR HEATING AN OBJECT IN AN INTENSE MAGNETIC FIELD

(71) Applicants: CENTRE NATIONAL DE LA RECHERCHE SCIENTIFIQUE (CNRS), Paris (FR); UNIVERSITE JOSEPH FOURIER—GRENOBLE 1, St. Martin d'Heres (FR)

(72) Inventors: Pierre-Frederic Sibeud, Moirans (FR); Eric Beaugnon, Gieres (FR); Gilles Pont, Tullins (FR)

(73) Assignees: CENTRE NATIONAL DE LA RECHERCHE SCIENTIFIQUE (CNRS), Paris (FR); UNIVERSITE JOSEPH FOURIER—GRENOBLE 1, St. Martin D'Heres (FR)

( * ) Notice: Subject to any disclaimer, the term of this patent is extended or adjusted under 35 U.S.C. 154(b) by 139 days.

(21) Appl. No.: 14/345,925

(22) PCT Filed: Sep. 20, 2012

(86) PCT No.: PCT/EP2012/068498
§ 371 (c)(1),
(2) Date: Mar. 19, 2014

(87) PCT Pub. No.: WO2013/041601
PCT Pub. Date: Mar. 28, 2013

(65) Prior Publication Data
US 2014/0226959 A1    Aug. 14, 2014

(30) Foreign Application Priority Data
Sep. 20, 2011  (FR) ..................... 11 58340

(51) Int. Cl.
| | |
|---|---|
| *F26B 3/30* | (2006.01) |
| *F26B 19/00* | (2006.01) |
| *H01L 51/56* | (2006.01) |
| *H05B 3/00* | (2006.01) |
| *C21D 1/04* | (2006.01) |
| *C21D 1/09* | (2006.01) |
| *C21D 1/34* | (2006.01) |
| *B23K 26/06* | (2014.01) |

(52) U.S. Cl.
CPC .......... *H05B 3/0061* (2013.01); *B23K 26/0643* (2013.01); *B23K 26/0648* (2013.01); *C21D 1/04* (2013.01); *C21D 1/09* (2013.01); *C21D 1/34* (2013.01)

(58) Field of Classification Search
None
See application file for complete search history.

(56) References Cited

U.S. PATENT DOCUMENTS

| | | | | |
|---|---|---|---|---|
| 4,907,533 | A * | 3/1990 | Nelson ................. | F26B 3/283 118/663 |
| 6,013,158 | A * | 1/2000 | Wootten ............... | B01D 53/24 202/100 |

(Continued)

FOREIGN PATENT DOCUMENTS

| | | |
|---|---|---|
| EP | 0151759 A2 | 8/1985 |
| EP | 0382125 A1 | 8/1990 |

(Continued)

OTHER PUBLICATIONS

Modest, M., Radiative Heat Transfer, 2nd Edition, Academic Press (2003), pp. 90-93.
Takahashi, K., et al., "Magnetic orientation of paraffin in a magnetic levitation furnace," Physica B, vol. 346 (2004), pp. 277-281.

*Primary Examiner* — Thor Campbell
(74) *Attorney, Agent, or Firm* — Blakely Sokoloff Taylor & Zafman LLP

(57) ABSTRACT

The invention concerns a device for heating an object (6) in an intense magnetic field, comprising:—a light source (1), an optic fiber (2) for transporting the light emitted by said light source (1) and emitting a beam of light in the direction of the object (6) to be heated, a converging optical system (3), a diaphragm (4) positioned at the focusing point of the optical system (3),—a reflector (5), whereof the inner wall is defined by the revolution of a semi-parabola around an axis perpendicular to the optical axis of the parabola and passing through the focal point of said parabola, the optical axis of said reflector (5) coinciding with the optical axis (A) of the optical system (3) and the focal point (F") of said reflector coinciding with the focusing point of said optical system (3).

10 Claims, 9 Drawing Sheets

(56) References Cited

U.S. PATENT DOCUMENTS 7,471,885 B2 * 12/2008 Mizukawa ............... H01J 5/32
              313/271
2007/0110413 A1 * 5/2007 Konishi ................. F24C 7/065
              392/407

FOREIGN PATENT DOCUMENTS

| EP | 0630720 A1 | 12/1994 |
| RU | 2275432 C1 | 4/2006 |
| WO | WO 2011/012673 A1 | 2/2011 |

* cited by examiner

DEVICE AND METHOD FOR HEATING AN OBJECT IN AN INTENSE MAGNETIC FIELD

FIELD OF THE INVENTION

The present invention relates to a device and a method for heating an object comprising a magnetic material under intense magnetic field.

BACKGROUND OF THE INVENTION

Working with material under a magnetic field—especially a so-called <<intense>> magnetic field, that is, whereof the intensity is of the order of several Tesla or even tens of Tesla—forms the object of numerous scientific investigations.

A branch of operations known as <<magneto-science>> has emerged, the aim of which is to combine application of a magnetic field to a method for developing material.

The magnetic field is considered as an additional parameter which can influence either the morphology of the material during its manufacture or the kinetics of development methods used, as do parameters such as temperature, pressure or chemical composition.

In this sense, the magnetic field can be used to modify the usage properties of material.

If numerous effects of the magnetic field are still the object of fundamental studies, others are now already involved in industrial processes for synthesising materials.

In fact, superconductive magnets benefit regularly from major advances both in terms of performance and in terms of costs, which make their use feasible in industrial processes, especially in the field of development and treatment of metals.

Treatments conducted under intense magnetic field almost always involve thermal treatment for heating the object to be treated to a determined temperature.

Currently, heating devices comprise resistive or inductive heating elements.

Document WO 2011/012673 describes a device for treatment of an object under intense magnetic field comprising, for example, heating of the object followed by quenching.

However, since an electric current passes through the heating elements, coupling takes place between the superconductive magnet which generates the magnetic field and the heating elements, due to Laplace and Lorentz forces.

This coupling leads to rapid deterioration of the heating elements, requiring frequent replacement of said elements.

To this end, the article by K. Takahashi et al., <<Magnetic orientation of paraffin in a magnetic levitation furnace>>, Physica B 346-347 (2004), pp 277-281, proposes reflecting a beam emitted by a YAG laser onto two conical mirrors to form an annular beam perpendicular to the beam emitted by the laser about a sample to be heated.

However, this device is very bulky and is not compatible with the highly restricted volume imposed by devices for generating an intense magnetic field.

Finally, because of its two mirrors, this device is relatively heavy.

Also, there is a need to carry out so-called <<flash>> annealing, that is, with a very rapid rise in temperature to the preferred temperature to avoid any microstructural transformation of the material during heating.

So, the aim is to effect a rise in temperature of the order of several hundreds of ° C./s up to a maximal temperature which may be greater than or equal to 1600° C. under a magnetic field of 16 T.

However, the heating elements of known devices have thermal inertia which does not enable such a rapid rise in temperature, with the best results obtained to date being of the order of a few tens of ° C./s.

Also, available space in the intense magnetic field is highly restricted, the field hole of the superconductive magnet being of the order of 32 mm at ambient temperature.

It is therefore necessary to design a highly compact heating device adapted for inserting into this environment.

Another constraint to keep in mind in designing a heating device is that the object being treated must be able to be equipped with measuring instruments (sensors, probes, etc.) so that it can be characterised.

It is therefore necessary to provide sufficient volume around the object to accommodate these instruments.

The aim of the invention is therefore to overcome all these obstacles and provide a heating device for an object in an intense magnetic field, which permits very rapid rises in temperature (up to several hundreds of ° C./s) and which is sufficiently compact for inserting into the device for generation of the intense magnetic field.

This device must also be more robust than existing heating devices and minimise interactions with the magnetic field.

BRIEF DESCRIPTION OF THE INVENTION

According to the invention, a device for heating an object comprising a magnetic material under intense magnetic field is proposed, comprising:
  a light source,
  fibre optics for transporting light emitted by said light source and emitting a light beam in the direction of the object to be heated,
  a convergent optical system whereof the optical axis is aligned with the axis of the light beam,
  a diaphragm placed at the focal point of the optical system,
  a reflector whereof the inner wall is defined by the revolution of a semi-parabola about an axis perpendicular to the optical axis of the parabola and passing through the focal point of said parabola, the optical axis of said reflector coinciding with the optical axis of the optical system and the focal point optical of said reflector coinciding with the focal point of said optical system,
  a support for the object to be heated, placed inside the reflector,
  said device being also adapted to generate an intense magnetic field around the object to be heated.

<<Intense magnetic field>> in the present text means any magnetic field of intensity greater than or equal to 1 Tesla.

At any given point of the environment of the object to be heated, said magnetic field can be constant over time, or variable.

Also, said magnetic field can be constant at any point of the environment of the object to be heated, or else can be different according to the site in question, for example distributed according to a gradient.

Said object to be heated is constituted at least in part by magnetic material.

This object can be for example a manufactured item which must be treated thermally, especially if the method is run on an industrial scale.

Said object can also be a sample of standardised form, for example when the method is executed in a search context, for studying the effects of thermal treatment under intense magnetic field on the structure of the material.

Because of the wise design of this optical device, and especially the particular form of the inner wall of the reflector, the result is a heating device for heating the object with a rise in temperature speed which may reach several hundreds of ° C./s while still being particularly compact and consequently compatible with the volume available in the field hole of a superconductive magnet.

According to advantageous characteristics of said device, taken alone or in combination:
- the light source is a laser diode or a laser;
- the wavelength of the light beam emitted by said source is greater than or equal to 800 nm;
- the diaphragm and the reflector are made of copper;
- the surface of the diaphragm and of the reflector on the side of the object to be heated is coated with a layer of gold.

According to a first embodiment of the invention, the optical system consists of a converging lens.

According to a second embodiment of the invention, the optical system comprises successively on the trajectory of the light beam a convex lens and an aspherical lens whereof the optical axes coincide, the focal point of the reflector coinciding with the focal point of said aspherical lens.

Another aspect of the invention concerns a method for heating an object comprising a magnetic material under intense magnetic field, characterised in that it comprises:
- emission, in the direction of said object to be heated, of a light beam,
- refraction of said beam via a convergent optical system whereof the optical axis is aligned with the axis of the light beam,
- passage of said refracted beam via a diaphragm placed in the focal point of said optical system,
- reflection of said beam onto the internal wall of a reflector, said inner wall being defined by the revolution of a semi-parabola about an axis perpendicular to the optical axis of the parabola and passing through the focal point of said parabola, the optical axis of said reflector coinciding with the optical axis of the optical system and the focal point of said reflector coinciding with the focal point of said optical system,
- application of an intense magnetic field to the object to be heated, said object being placed inside the reflector.

According to a first embodiment of the heating method according to the invention, the optical system consists of a converging lens.

According to a second embodiment of the heating method according to the invention, said optical system comprises successively, on the trajectory of the light beam, a convex lens and an aspherical lens whereof the optical axes coincide, the focal point of the reflector coinciding with the focal point of said aspherical lens.

BRIEF DESCRIPTION OF THE DRAWINGS

Other characteristics and advantages of the invention will emerge from the following detailed description in reference to the attached drawings, in which.

DETAILED DESCRIPTION OF THE INVENTION

The magnetic field is generated by any device producing the required intensity, which is typically greater than 1 Tesla.

The application device of the magnetic field is known per se. It can be a system of permanent magnets, an electromagnet, a supraconductive coil, a resistive magnet or a hybrid magnet (combination of a resistive magnet and a supraconductive coil).

Preferably, it is fitted with a water jacket which protects the magnet from thermal radiation emanating from the device.

In a particularly advantageous way, a supraconductive coil cooled of Cryogen-free superconducting magnet type, marketed by the company Cryogenic Limited, is used and is easy to use, lightweight and therefore industrially applicable.

In contrast to known devices based on resistive or inductive heating elements, the device of the invention is an optical device adapted for uniformly heating the object by way of the energy supplied by a light source.

Such an optical heating device has the advantage of not generating electromagnetic coupling with the device for generation of the intense magnetic field.

Consequently, there is no risk of deterioration of the heating device due to interactions with the intense magnetic field.

Figure 1:
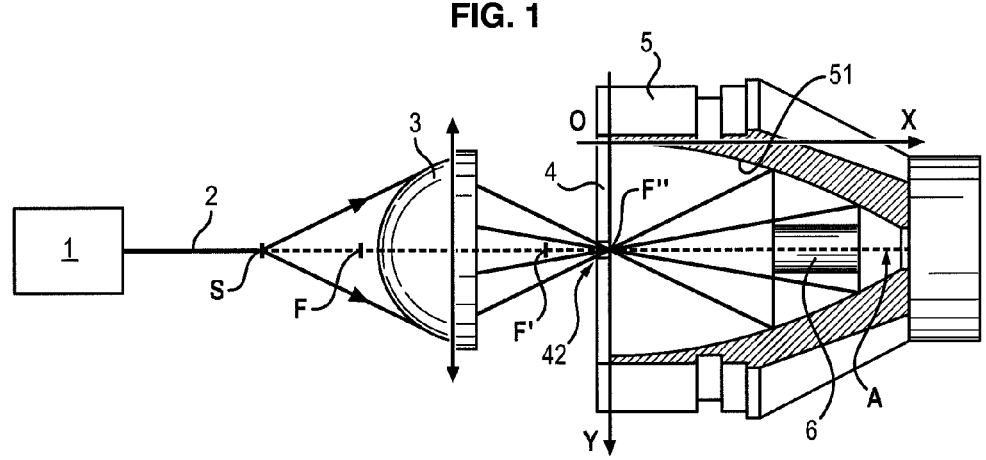
FIG. 1 is an optical design of a first embodiment of the heating device according to the invention.

According to a first embodiment shown in FIG. 1, the heating device comprises a light source 1 connected to fibre optics 2 which transport light emitted by the light source and generate a light beam.

The exit point of the beam of the fibre optics 2 is shown by the marker S.

An optical system 3, of focal points F (focal point object) and F' (focal point image), is placed on the trajectory of the light beam so that its optical axis A coincides with the axis of the fibre optics at point S.

The heating device also comprises a reflector 5 enclosing the object 6 to be heated.

Said reflector 5 is a hollow volume whereof the inner wall 51 has a profile of semi-parabola whereof the axis of revolution coincides with the optical axis A of the optical system 3.

It is placed on the optical path such that the focal point F" of the reflector is placed at the focal point of the optical system 3.

Also, a diaphragm 4 is placed at the focal point F" of the reflector which, as indicated above coincides with the focal point of the optical system 3.

With respect to light rays, the reflector 5 is therefore a closed volume whereof the sole opening is the orifice 42 of the diaphragm 4.

The reflector 5 and the diaphragm 4 are made of materials having surface states adapted to reflect the light of the light source.

The object 6 to be heated is an object comprising a magnetic material (so that its properties are influenced by the intense magnetic field during heating).

In the examples described hereinbelow, the object 6 is a cylinder of an iron-nickel alloy, though it is understood that the invention applies to heating any other form of object and any other magnetic material.

The dimensions of the object are of the order of 5 mm in width (perpendicularly to the optical axis A) and 10 mm in height (according to the optical axis A).

If the object is not of cylindrical shape (it can in fact have any form) it must all the same be included in a cylinder of 5 mm in diameter and 10 mm in height and whereof the axis of revolution coincides with the optical axis A of the optical system.

Light Source

The light source is preferably a high-power laser diode.

The advantage of such a source is that it puts out a strong power density which can be transported and oriented directively by fibre optics of very small footprint.

Also, laser diodes currently offer the best compromise in terms of power (up to 1 kW), weight and bulk.

However, other adequate light sources could be employed without as such departing from the scope of the present invention.

For example, a YAG laser, widely used in the industrial field, is suited for implementing the invention.

In fact, for the wavelength (1.06 µm) of the YAG laser, the optical system has reflectivity greater than 0.98 for copper and gold (cf. FIG. 4 described below).

The optical device described hereinbelow converts the point-like lighting emitted by the light source into directional lighting able to illuminate the object to be heated substantially uniformly over its entire surface.

Reflector

Figure 2:
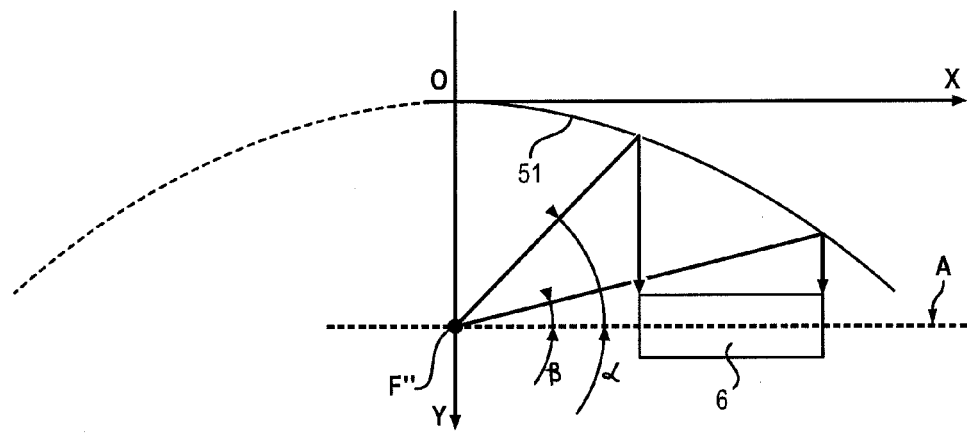
FIG. 2 is a design illustrating reflection of light rays in the reflector in the form of a semi-parabola.

FIG. 2 illustrates the reflection of light rays originating from the focal point F''' of the reflector on the wall 51 of the reflector 5.

The internal wall 51 of the reflector 5 is defined by the revolution of a semi-parabola about an axis parallel to the axis OX and passing through the focal point F''' of the reflector, which is also the optical focal point of the parabola.

FIG. 2 illustrates the other half of the parabola (that is, its symmetry relative to the optical OY axis of the parabola) in dotted lines.

The axis of revolution of the semi-parabola, which also constitutes the optical axis of the reflector 5, is perpendicular to the optical OY axis of said parabola.

Said axis of revolution also coincides with the optical axis A of the optical system.

As can be seen on FIG. 2, the rays emitted by a point light source located at the focal point F''' are reflected onto the semi-parabola and provide rays parallel to the OY axis.

These rays light up the object 6 to be heated, here represented in the form of a cylinder, substantially uniformly over its entire height.

Also, the lighting of the object 6 occurs perpendicularly to its height, representing the optimal incidence for heating by radiation.

The angles $\alpha$ and $\beta$ represent the divergence of the specific source.

It is evident therefore that the greater the divergence $\alpha$, $\beta$, the more the object to be heated can be moved away from the focal point F''' so as to favour the uniformity of its lighting.

A point source which is the most divergent possible is therefore sought to heat a cylindrical object of around 1 cm in height.

However, fibre optics do not produce divergence (also called digital opening) sufficient to respond to this objective.

Also, excessive proximity to the object to be heated would risk damaging it by exposing it to very high temperatures.

The optical system 3 described in detail hereinbelow focuses the entire laser beam onto the focal point F''' of the reflector 5.

Figure 3:
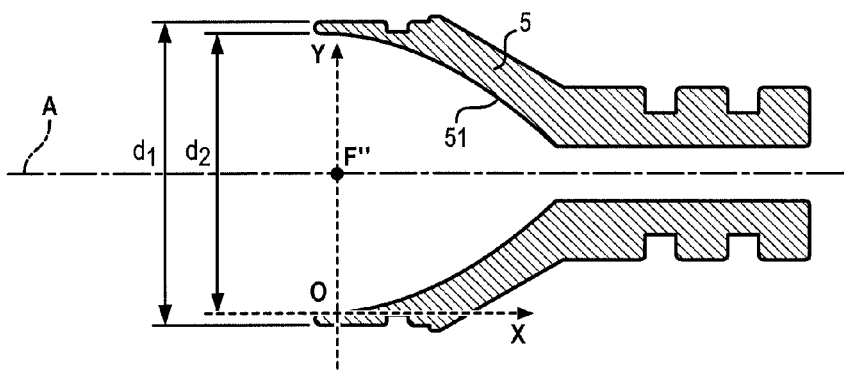
FIG. 3 is a sectional view of the reflector according to the invention.

FIG. 3 is a sectional view of the reflector 5 describing its dimensioning.

The diameter $d_1$ corresponds to the maximum external bulk of the reflector 5.

As explained earlier, the heating device must in fact be as compact as possible to be compatible with the device for generation of intense magnetic field.

For example, the diameter $d_1$ is 28 mm.

The diameter $d_2$ is the widest inner diameter of the reflector 5. It is measured along the OY axis and corresponds to the difference between the outer diameter $d_1$ and the thickness of the reflector, which is in this zone the least possible for creating the greatest possible inner volume.

For example, $d_1$ is 26 mm. This value corresponds to twice the distance OF''', which is therefore 13 mm in this example.

The equation of the semi-parabola can be deduced from the position of the focal point F''':

$$Y=X^2/(4*OF''')$$

In the example given above, the equation of the semi-parabola is therefore $Y=X^2/52$.

Diaphragm

The diaphragm 4 comprises a flat plate pierced by an orifice 42 located at the focal point of the optical system 3, such that the rays diffracted by the optical system 3 are focussed at the level of said orifice 42 and all enter the reflector 5; the flat plate is as such reflecting so as to reflect the rays which strike it towards the object 6 to be heated.

The materials of the reflector 5 and of the diaphragm 4 are selected to have, at the wavelength of the light source 1, maximal reflectivity, that is, closest to 1.

Figure 4:
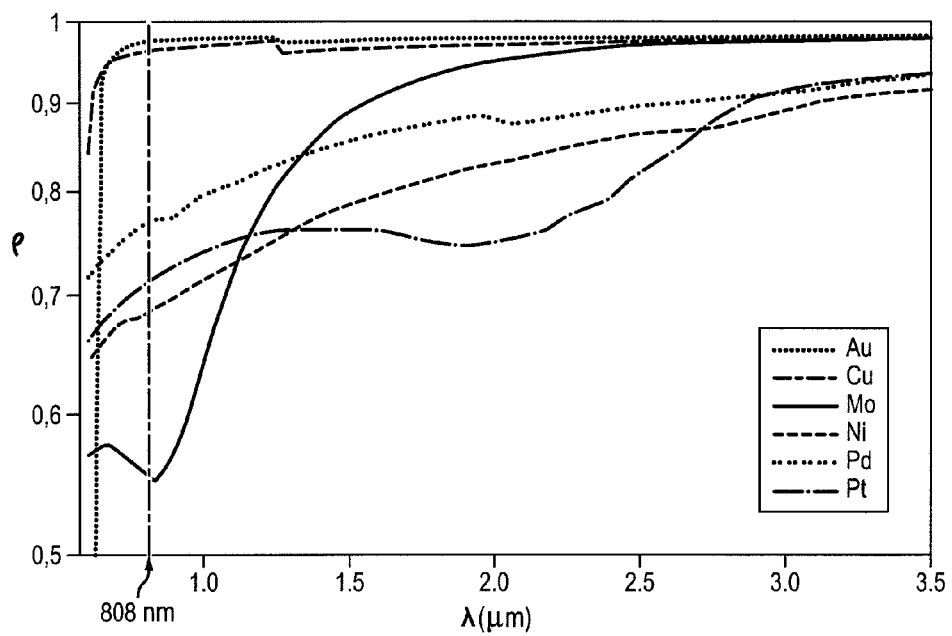
FIG. 4 shows the curves of reflectivity of different materials as a function of wavelength.

FIG. 4 presents the curves of reflectivity ρ (according to a logarithmic scale) as a function of the wavelength λ (in µm) for different materials: gold, copper, molybdenum, nickel, palladium and platinum.

Therefore, for a light source 1 comprising a laser emitting at a wavelength of 808 nm, copper and gold constitute optimal materials for the reflector 5 and the diaphragm 4, since their reflectivity is close to 0.96.

Copper also has the advantage of being easy to machine, is inexpensive and has good thermal conductivity.

According to a preferred embodiment of the invention, the reflector 5 and the diaphragm 4 are therefore made of copper.

Optionally, a layer of gold, whereof the thickness is for example 0.5 µm, can be deposited on copper to protect it from oxidation, which optimises the optical reflection properties of the reflector and of the diaphragm.

Also, for the reflector 5 and the diaphragm 4 to have optimal reflectivity, their surface (or, if needed, that of the layer of gold which covers it) must have minimal optical roughness.

According to the work by M. Modest, Radiate Heat Transfer, $2^{nd}$ Edition, Academic Press (2003), pp 90-93, the effect of optical roughness a of a surface on its reflectivity is linked to the ratio between the average height Ra of rough patches and the wavelength of reflected beams, according to the formula: $\sigma = Ra/\lambda$.

So, for the application specified in the invention, optical roughness must be less than 0.1, which, for a wavelength of 0.806 µm, results in tolerating maximal roughness of 80 nm.

To obtain such a surface state, very fine polishing of the inner wall 51 of the reflector and of the surface of the diaphragm facing the object to be heated is undertaken.

Figure 5:
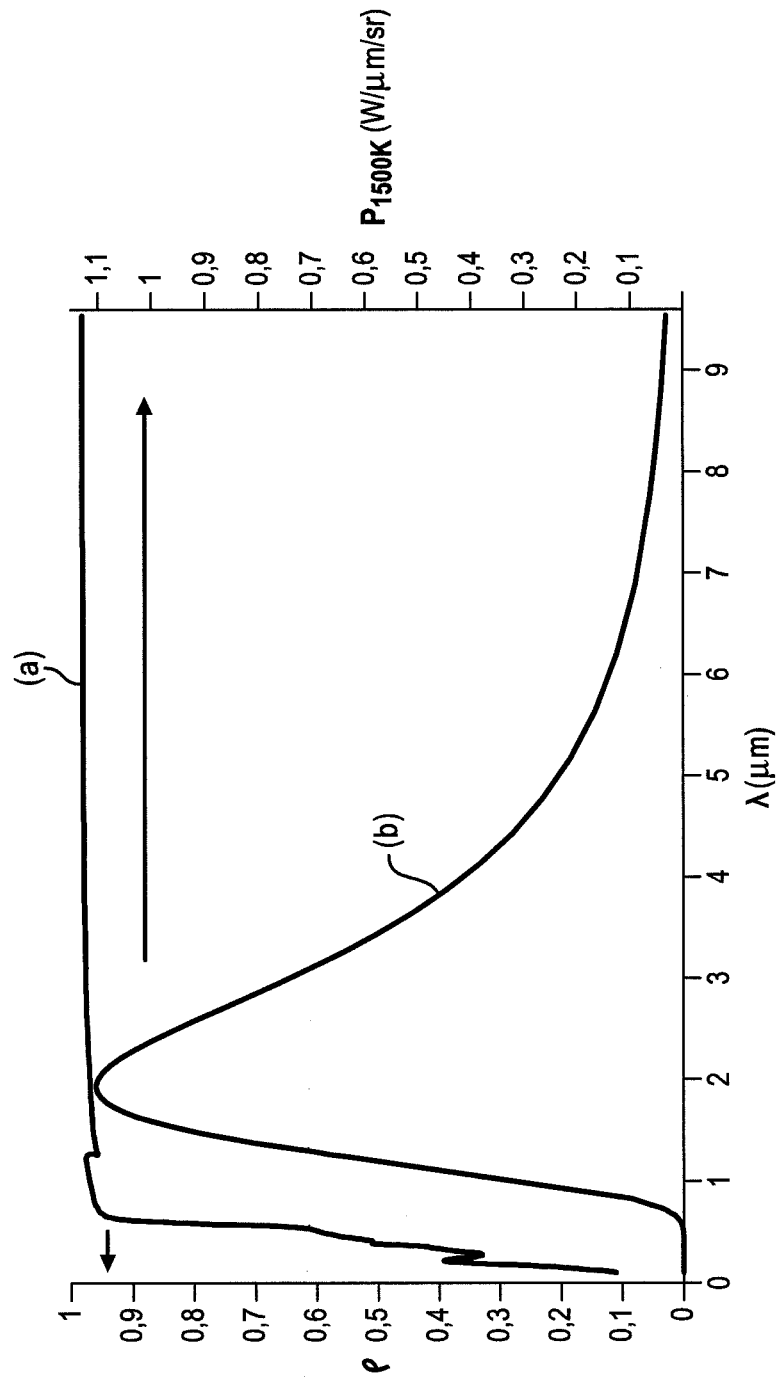
FIG. 5 shows the curves of reflectivity in normal incidence of copper as a function of wavelength (a) and of the monochromatic directional power emitted by an object which, in this case, was cylindrical, assimilated into a black body of diameter 4 mm and height 7 mm heated to 1500 K (b)

FIG. 5 shows the reflectivity ρ at normal incidence of copper as a function of the wavelength λ (curve (a)) as well as the monochromatic directional power $P_{1500K}$ (in W/µm/sr) emitted by the object 6 to be heated, assimilating said object into a cylindrical black body of 7 mm in height and 4 mm in diameter, at a temperature of 1500 K (curve (b)).

This graphic verifies that copper has a reflectivity of between 0.96 and 0.98 over the range of emission wavelength of the object heated to 1500 K.

The surfaces of the wall 51 of the reflector 5 and of the diaphragm 4 can therefore be considered as being quasi adiabatic with respect to radiation emitted by the object 6 heated to 1500 K.

Because the walls of the reflector 5 and of the diaphragm 4 are made of copper, which is a very good thermal conductor and whereof losses via absorption (whether due to absorption of radiation emitted by the light source 1 or to absorption of radiation emitted by the object 6 heated to 1500 K) are negligible, are therefore isothermal. So, even though the reflection coefficient of copper varies with temperature, in this situation it remains constant and at its maximum throughout heating of the object, which confirms interest in this material.

Also, as mentioned earlier, a layer of gold can be deposited on the copper without modifying its optical roughness and protect it from oxidation while preserving its reflection properties.

Optical System

According to a first embodiment, illustrated in FIG. 1, the optical system 3 consists of a single converging lens of focal points F and F'.

As the light beam at the exit S of the fibre optics is divergent, the focal point, at the placement of which the orifice 42 of the diaphragm 4 and the focal point F'' of the reflector 5 are positioned, is distinct from the focal point F' of the converging lens.

Figure 6:
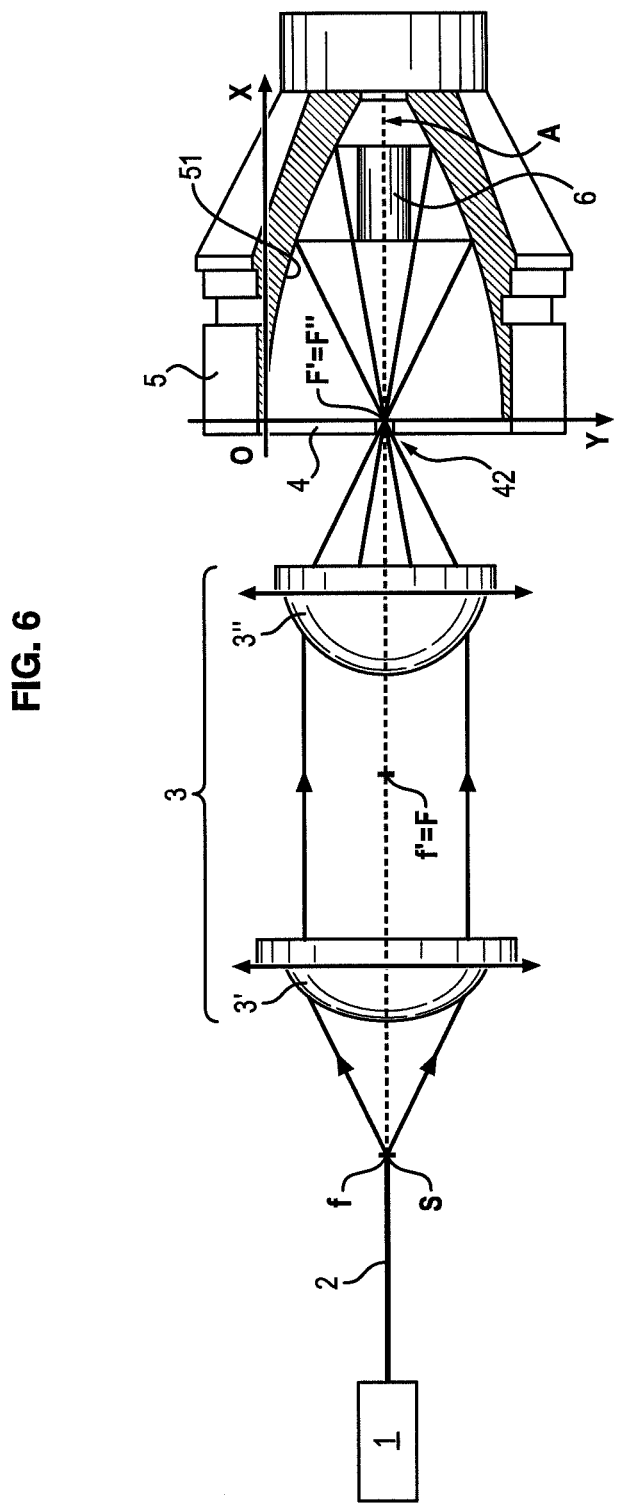
FIG. 6 is an optical design of a second embodiment of the heating device according to the invention.

According to a second embodiment, illustrated in FIG. 6, the optical system 3 is constituted by two converging lenses, the first one being a convex lens 3' of focal points f, f' and the second one an aspherical lens 3'' of focal points F, F', the optical axes of these two lenses coinciding.

The convex lens 3' is located upstream of the aspherical lens 3'' on the trajectory of the light rays.

The exit S of the fibre optics 2 is located at the focal point f of the convex lens 3'.

Consequently, the beam diffracted by the convex lens 3' is parallel.

Also, the focal point object F of the aspherical lens 3'' is located at the focal point image f' of the convex lens.

Therefore, the aspherical lens 3'' focuses the parallel beam onto its focal point F' which coincides with the focal point F'' of the semi-parabola of the reflector and the orifice 42 of the diaphragm 4.

This system has two advantages: the first is that it is easier to adjust than that of the first embodiment, the focal distances of the lenses being known precisely; the second is that it produces maximal divergence of the light beam exiting from focal point F' of the optical system 3 which coincides with F'''.

Figure 7:
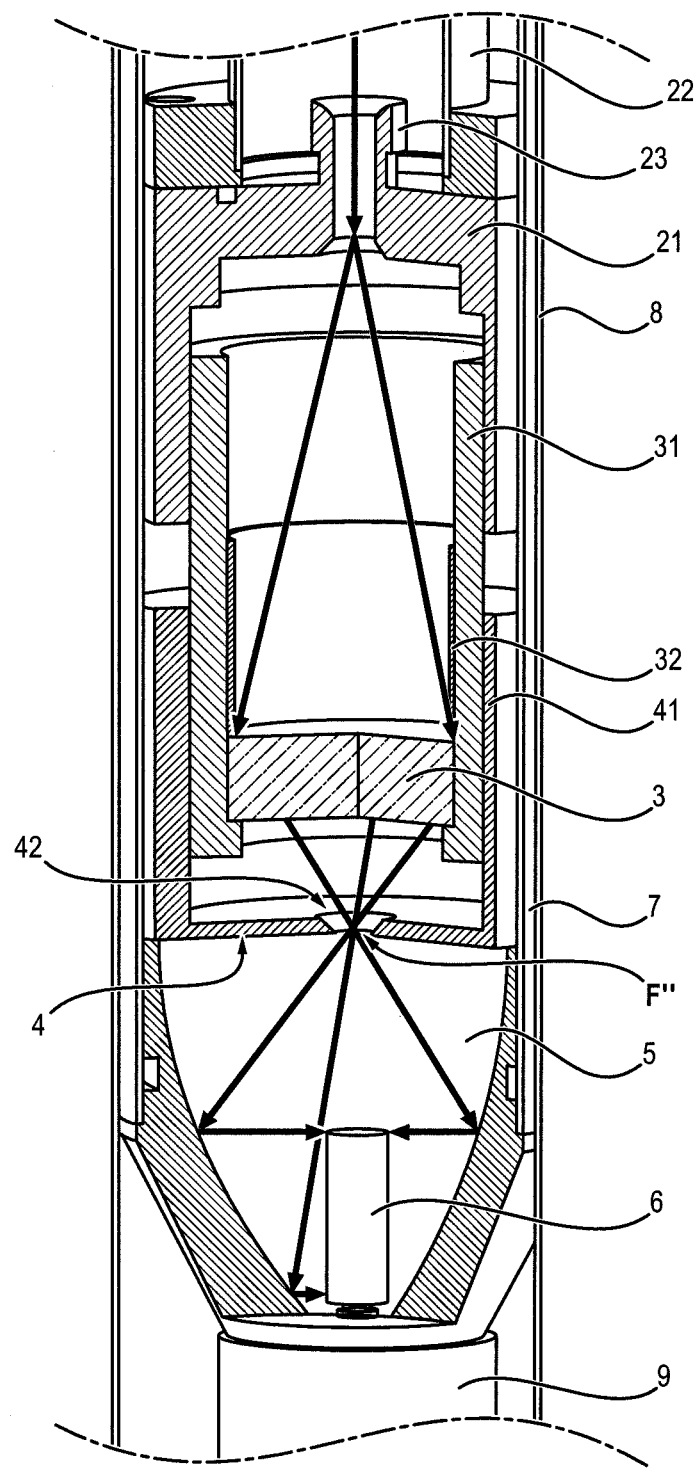
FIG. 7 is a sectional view at 120° of the device according to the first embodiment of the invention.
Figure 8:
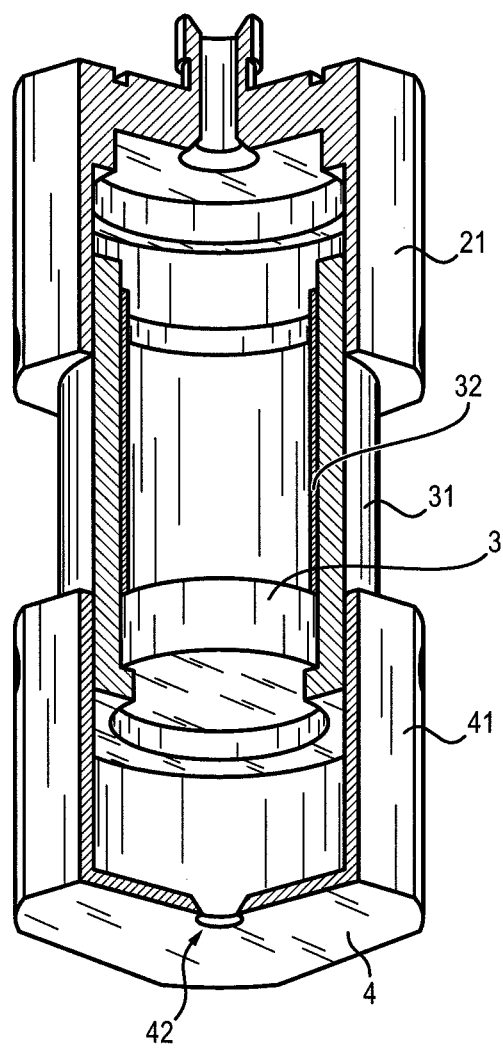
FIG. 8 is a perspective view of part of the device of FIG. 7.
Figure 9:
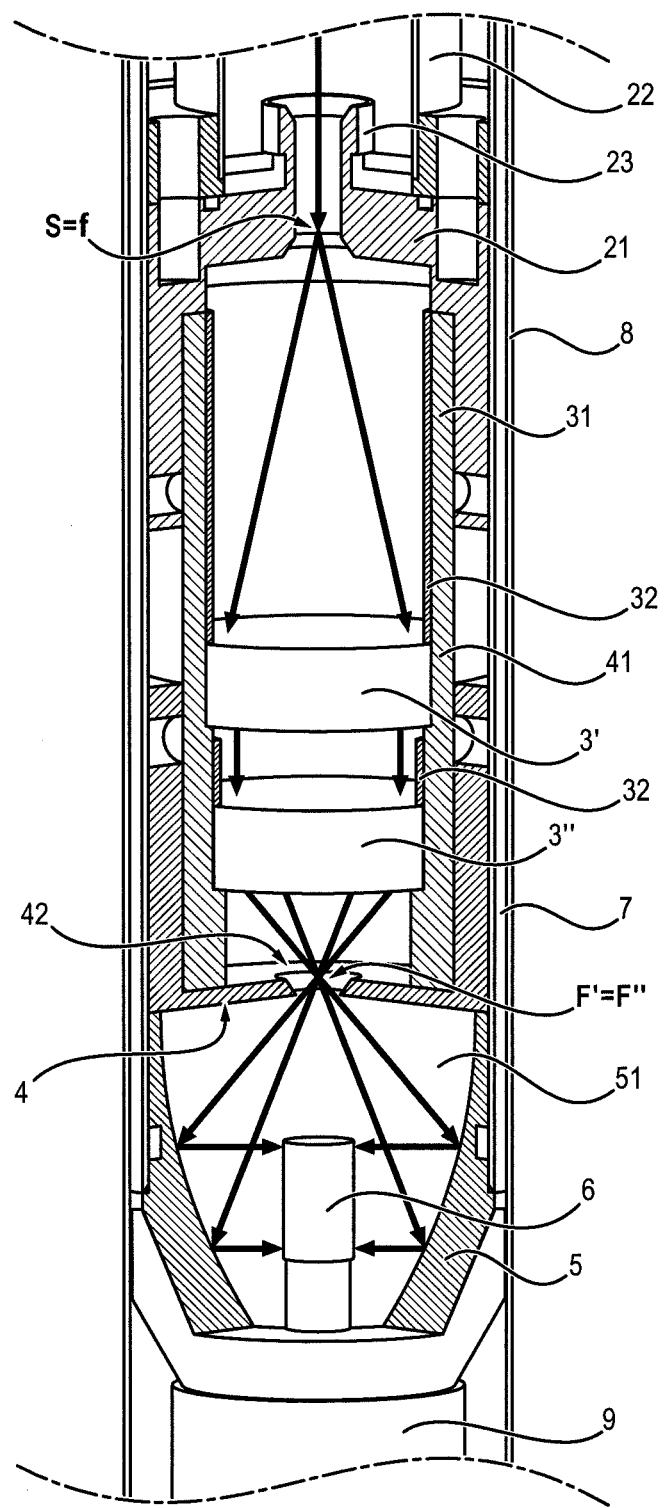
FIG. 9 is a sectional view at 120° of the device according to the second embodiment of the invention.
Figure 10:
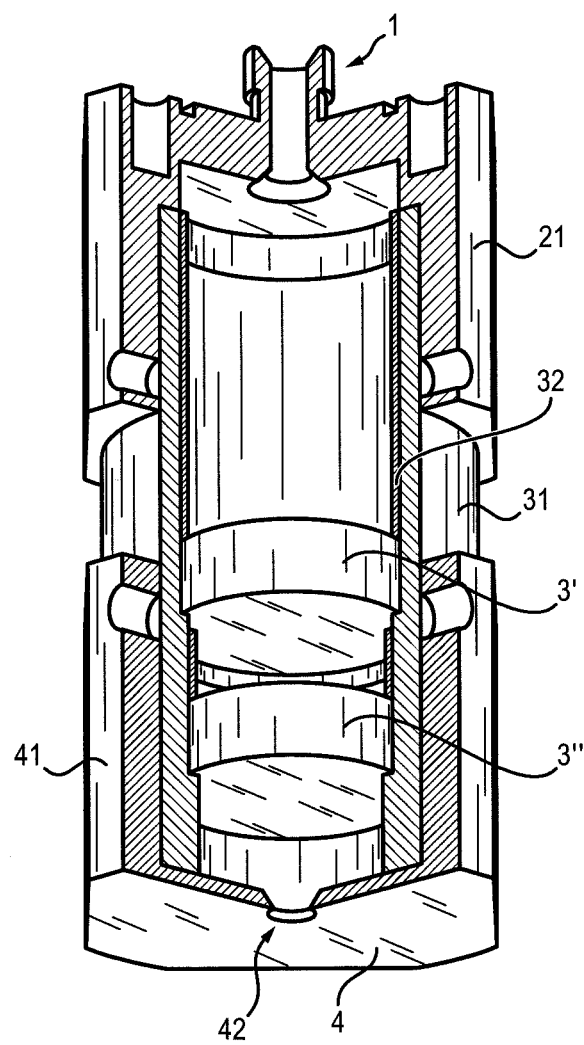
FIG. 10 is a perspective view of part of the device of FIG. 9.

With respect to the mechanical design of the heating device, reference can be made to FIGS. 7 and 8 for the first embodiment of the optical system and to FIGS. 9 and 10 for the second embodiment of the optical system.

FIG. 7 presents a sectional view of the device as per the first embodiment of the invention.

The fibre optics (not shown) is confined in a tube 22, for example made of stainless steel.

The fibre optics is connected to the inlet 23 of a connection element 21.

The converging lens 3 is supported by a tube 31, which is for example made of stainless steel.

It is blocked inside this tube 31 by a blocking element 32.

The connection element 21 of the fibre optics is arranged to slide on the tube 31 to allow adjusting the distance between the exit of the fibre optics and the lens 3.

On the other side of the lens 3, the diaphragm 4 is arranged to slide (by means of a wall 41) on the support tube 31 of the lens 3, which allows adjusting the distance between the diaphragm and the lens.

The device is enclosed by a water jacket whereof the function is to thermally insulate the device for generation of the intense magnetic field (not illustrated) in relation to the heat generated during heating of the object 6.

To this effect, the water jacket is typically formed by an assembly of tubes 7, 8, 9 delimiting a volume of water in circulation.

An outer tube 8 defines the envelope external of the water jacket.

As the available bulk is very limited, this outer tube 8 encloses the optical system 3, the diaphragm 4 and the reflector 5 with fairly small clearance.

For example, the outer diameter of the tube 8 is 32 mm whereas its inner diameter is around 31 mm.

A first inner tube 7 is arranged in the outer tube 8 for enclosing the optical system 3 and the reflector 5.

For example, the outer diameter of the tube 7 is 29 mm and its inner diameter is 28 mm.

A thin blade of water can therefore circulate between the tubes 7 and 8.

A second inner tube 9 is arranged against the reflector 5, in the extension of the optical axis A of the optical system.

Said tube 9 has for example an outer diameter of 18 mm and an inner diameter of 17 mm.

Due to the outer flared form of the reflector 5, there is, especially around the object to be heated 6, a larger volume of water.

FIG. 8 is a perspective view of items 3, 31, 32 and 4.

FIG. 9 is a sectional view of the device as per the second embodiment of the invention.

The elements bearing the same reference numerals as in FIG. 7 fulfil the same function.

This device differs essentially from the preceding one in that it comprises a convex lens 3' and an aspherical lens 3'' supported by a support tube 31.

Two blocking elements 32 keep said lenses in the tube 31.

In this device, the water jacket 7, 8, 9 is similar to that described in reference to FIG. 7.

FIG. 10 is a perspective view of items 3', 3'', 31, 32 and 4.

Experimental Results

Based on the device described hereinabove, producing the expected rise in temperature speed was demonstrated by tests conducted on an object made of an iron-nickel alloy of cylindrical form of 1 $cm^3$, having a diameter of 4 mm and a height of 7 mm, fitted with a thermocouple.

Said object was placed in the reflector such that its axis of revolution coincides with the optical axis of the optical system.

Figure 11:
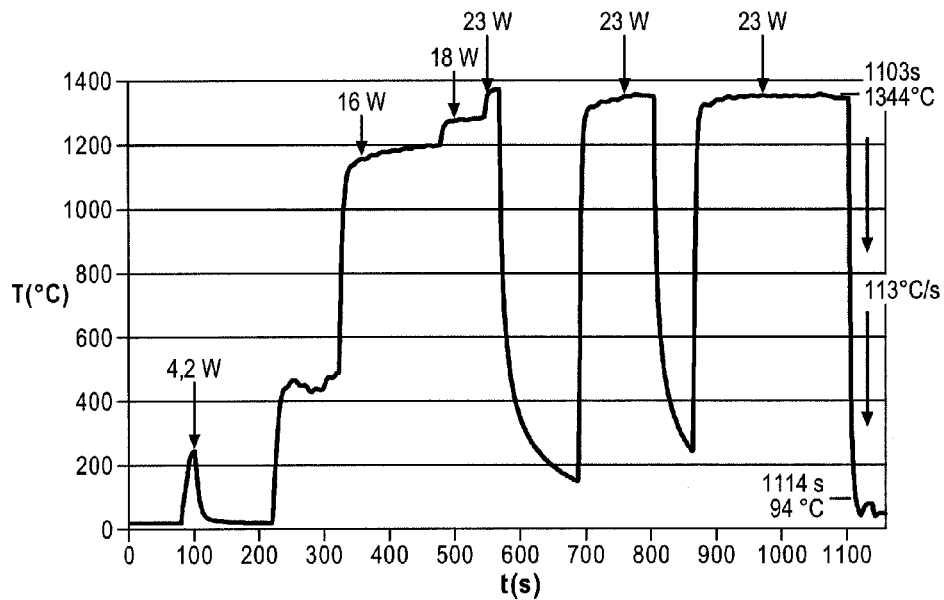
FIG. 11 shows measuring of the temperature of an object of 1 cm$^3$ made of iron/nickel as a function of time during an assay on the device as per the invention during heating-cooling cycles completed under vacuum for different powers of the light source.

FIG. 11 illustrates a first test consisting of progressively applying more and more power with the laser diode of 806 nm of wavelength constituting the light source, the device being under vacuum.

The diagram of FIG. 11 shows the temperature measured by the thermocouple as a function of time.

The power delivered by the laser diode is indicated above each portion of curve.

As can be seen in this figure, the priming threshold of the heating of the object by the laser diode is around 4 W under vacuum and produces a temperature of around 250° C.

It is verified then, with heating-cooling cycles, that the same temperature corresponds to a given power, showing that the device produces repeatable heating.

Also, it is evident that the heating and cooling slopes are very steep (of the order of 100° C./s at least), which reveals the low thermal inertia of the device.

On completion of the heating-cooling cycles quenching is carried out by injection of argon into the container; the quenching speed measured is 113° C./s.

It is also evident that, for a lower temperature of the order of 1200° C., conventional heating devices must provide the object with power of more than 300 W, i.e. 20 times greater than laser heating which, at 1200° C., provides only 18 W.

Figure 12:
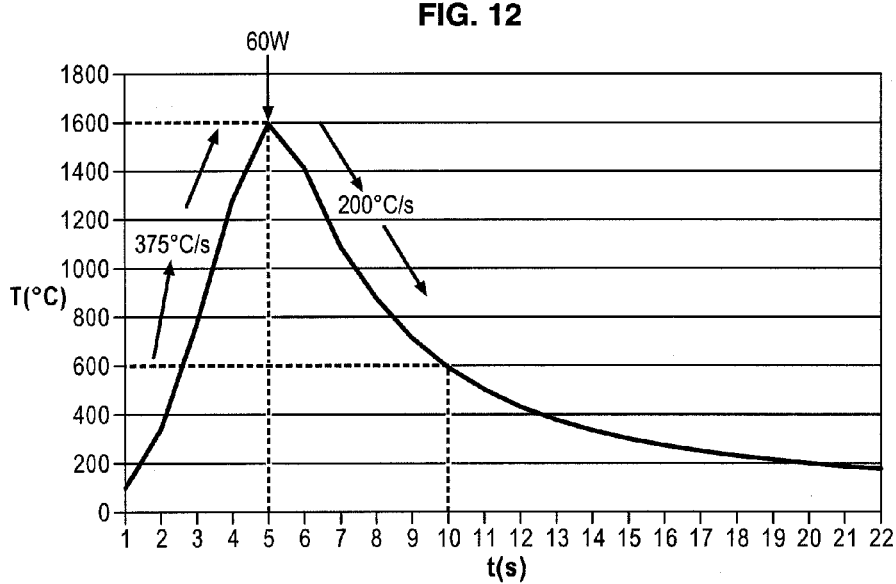
FIG. 12 shows the measuring of the temperature of an object of 1 cm$^3$ made of iron/nickel heated by the device according to the invention at full power.

FIG. 12 illustrates a second type of test conducted with the same device and the same type of object as previously, this time at full power (60 W) of the laser diode, under vacuum.

A temperature of 1600° C. is reached in 5 seconds, that is, a heating speed of between 266 and 375° C., corresponding to the desired aim of obtaining temperature rises more rapid than conventional heatings so as to allow <<flash>> annealing under intense magnetic field.

As this temperature is close to the melting temperature of the object and degradation of thermocouples, laser emission was then stopped suddenly.

The cooling speed is of the order of 200° C./s.

Also, the range of temperatures reached—between 250 and at least 1600° C.—is perfectly adapted to the different metallurgic treatments conducted in the field of research and in industry.

Finally, since heating is carried out optically only, there is no interaction with the magnetic field, resulting in a device much more robust than conventional heating devices.

It is understood that the examples just given are only particular illustrations and are in no way limiting as to the fields of application of the invention.

The invention claimed is:

1. A device for heating an object comprising a magnetic material under intense magnetic field, comprising:
    a light source,
    fibre optics for transporting the light emitted by said light source and emitting a light beam in the direction of the object to be heated,
    a convergent optical system whereof the optical axis is aligned with the axis of the light beam,
    a diaphragm placed at the focal point of the optical system,
    a reflector, whereof the inner wall is defined by the revolution of a semi-parabola about an axis perpendicular to the optical axis of the parabola and passing through the focal point of said parabola, the optical axis of said reflector coinciding with the optical axis of the optical system and the focal point of said reflector coinciding with the focal point of said optical system,
    a support for the object to be heated, placed inside the reflector,
    said device also being adapted to generate an intense magnetic field around the object to be heated.

2. The device of claim 1, wherein the light source is a laser diode or a laser.

3. The device of claim 1, wherein the wavelength of the light beam emitted by said source is greater than or equal to 800 nm.

4. The device of claim 1, wherein the diaphragm and the reflector are made of copper.

5. The device of claim 4, wherein the surface of the diaphragm and of the reflector on the side of the object to be heated is coated with a layer of gold.

6. The device of claim 1, wherein said optical system consists of a converging lens.

7. The device of claim 1, wherein said optical system comprises a convex lens and an aspherical lens whereof the optical axes coincide, the focal point of the reflector coinciding with the focal point of said aspherical lens.

8. A method for heating an object comprising magnetic material under intense magnetic field, said method comprising:
    emitting a light beam; in the direction of said object to be heated,
    refracting said beam via a convergent optical system whereof the optical axis is aligned with the axis of the light beam,
    passing said refracted beam via a diaphragm placed at the focal point of said optical system,
    reflecting said beam on the internal wall of a reflector, said inner wall being defined by the revolution of a semi-parabola about an axis perpendicular to the optical axis of the parabola and passing through the focal point of said parabola, the optical axis of said reflector coinciding with the optical axis of the optical system and the focal point of said reflector coinciding with the focal point of said optical system,
    applying an intense magnetic field to the object to be heated, said object being placed inside the reflector.

9. The method of claim 8, wherein said optical system consists of a converging lens.

10. The method of claim 8, wherein said optical system comprises a convex lens and an aspherical lens whereof the optical axes coincide, the focal point of the reflector coinciding with the focal point of said aspherical lens.

* * * * *

UNITED STATES PATENT AND TRADEMARK OFFICE
CERTIFICATE OF CORRECTION

PATENT NO.         : 9,241,372 B2
APPLICATION NO.    : 14/345925
DATED              : January 19, 2016
INVENTOR(S)        : Pierre-Frederic Sibeud, Eric Beaugnon and Gilles Pont It is certified that error appears in the above-identified patent and that said Letters Patent is hereby corrected as shown below:

In the Claims
In Column 10, Claim 8, line 34, please delete "emitting a light beam; in the direction" and insert -- emitting a light beam in the direction --

Signed and Sealed this
Twenty-third Day of August, 2016

Michelle K. Lee
*Director of the United States Patent and Trademark Office*